(12) United States Patent
Thelemann

(10) Patent No.: US 8,531,430 B2
(45) Date of Patent: Sep. 10, 2013

(54) METHODS AND APPARATUS FOR A TOUCH PANEL DISPLAY WITH INTEGRATED KEYS

(75) Inventor: Carl Thelemann, E Islip, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 859 days.

(21) Appl. No.: 12/704,082

(22) Filed: Feb. 11, 2010

(65) Prior Publication Data

US 2011/0193792 A1    Aug. 11, 2011

(51) Int. Cl.
*G06F 3/045* (2006.01)
(52) U.S. Cl.
USPC .......................... 345/174; 345/173; 178/18.05
(58) Field of Classification Search
USPC .... 345/156–174; 341/22, 33–34; 178/18.05, 178/18.06, 18.07
See application file for complete search history.

(56) References Cited

U.S. PATENT DOCUMENTS

| 7,336,263 | B2 | 2/2008 | Valikangas |
| 2002/0077156 | A1* | 6/2002 | Smethers ..................... 455/566 |
| 2002/0101409 | A1* | 8/2002 | Yokoyama et al. ........... 345/173 |
| 2003/0058225 | A1* | 3/2003 | Kusuda et al. ............... 345/173 |
| 2005/0253821 | A1* | 11/2005 | Roeder ......................... 345/173 |
| 2007/0039812 | A1* | 2/2007 | Sjostrom ...................... 200/512 |
| 2011/0122090 | A1* | 5/2011 | Suetomi et al. .............. 345/174 |

FOREIGN PATENT DOCUMENTS

WO    WO 2009145154 A1 *  12/2009

* cited by examiner

*Primary Examiner* — Hong Zhou

(57) ABSTRACT

A touch screen touch screen display includes a bottom conductor layer coupled to a top conductor layer. The bottom conductor layer extends beyond the top conductor layer adjacent the top conductor layer, exposing a region of the bottom conductor layer. One or more manually actuatable components (e.g., buttons) are coupled to the region of the bottom conductor layer. The bottom conductor layer may include a substrate (such as a polycarbonate layer) and a polymer layer (such as polyethylene terephthalate) formed on the substrate.

18 Claims, 4 Drawing Sheets

METHODS AND APPARATUS FOR A TOUCH PANEL DISPLAY WITH INTEGRATED KEYS

TECHNICAL FIELD

The present invention generally relates to touch panel displays, and more particularly relates to the use of traditional mechanical buttons and keys in conjunction with touch panel displays.

BACKGROUND

Touchscreens and other forms of touch panel components have become increasingly popular in recent years, particularly in the context of mobile devices, such as mobile phones, personal data assistants (PDAs), and the like.

It is often desirable to integrate standard, mechanical keys or buttons alongside "virtual" buttons displayed on the touchscreen display because, among other things, the tactile feedback provided by such buttons is often preferred for certain user interface functions. For example, a device may include a row of unmarked physical buttons adjacent to the touchscreen display, where, depending upon the context, certain indicia regarding the nature of each button is displayed next to the corresponding button. In this way, one physical button or key can be used for multiple purposes.

In such cases, it is desirable that the physical buttons be placed as close as possible to the touchscreen display, as this helps the user associate a particular button with its intended purpose, and also helps to decrease the footprint used by the physical buttons.

Accordingly, it is desirable to provide improved methods of integrating physical buttons with touchscreen panels. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, many conventional techniques and principles related to touch screen displays, resistive touch panels, user interfaces and the like are not described in detail herein.

In general, the present subject matter relates to a touchscreen system in which buttons, keys, or other such components are built upon or otherwise integrated with one layer of the touch screen display itself (e.g., a bottom polyethylene terephthalate (PET) layer). In this way, the keys are placed very close to the touchscreen region while at the same time simplifying assembly of the device.

Figure 1:
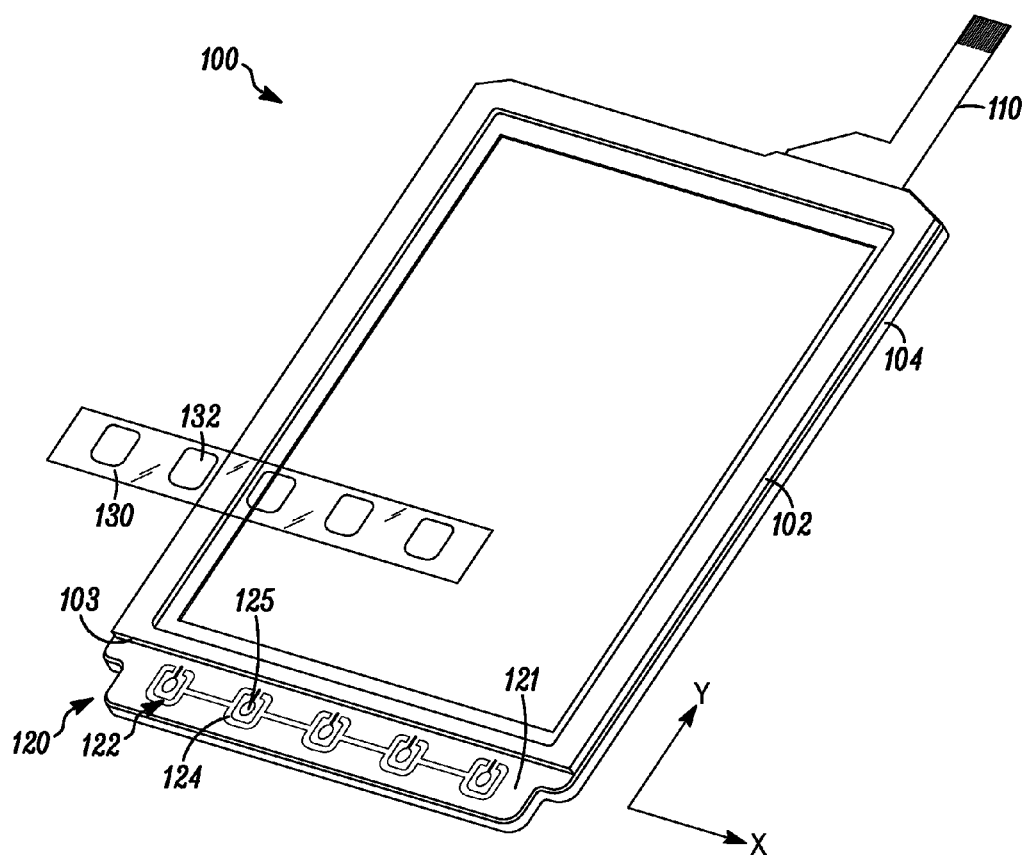
FIG. 1 depicts a touch panel assembly in accordance with one embodiment.

Referring now to FIG. 1, a touch screen assembly (or simply "assembly") 100 in accordance with one embodiment generally includes a top conductor layer 102 coupled to a bottom conductor layer 104, wherein each layer 102 and 104 typically comprises multiple sublayers (e.g., polymeric layers), as described in further detail below.

Layers 102 and 104 interact in any suitable manner (e.g., capacitively or resistively) to provide information regarding the location of a touch event occurring on or near assembly 100. In a particular embodiment, for example, layers 102 and 104 are conventional resistive touch panel elements that include conductive traces (not shown) printed on or otherwise incorporated into their structure. In such an embodiment, when a user makes contact with assembly 100 within a particular region (using, for example, a finger, stylus, or other manipulator), the metal traces associated with layers 102 and 104 within that region contact each other, providing a signal or characteristic resistance that is subsequently provided to external components via an interconnect, such as a flexible printed circuit (FPC) interconnect 110 as shown. In the interest of clarity, the various microprocessors, memory devices, power components, and other such conventional electronic devices that may communicate with assembly 100 via interconnect 110 are not illustrated.

Figure 2:
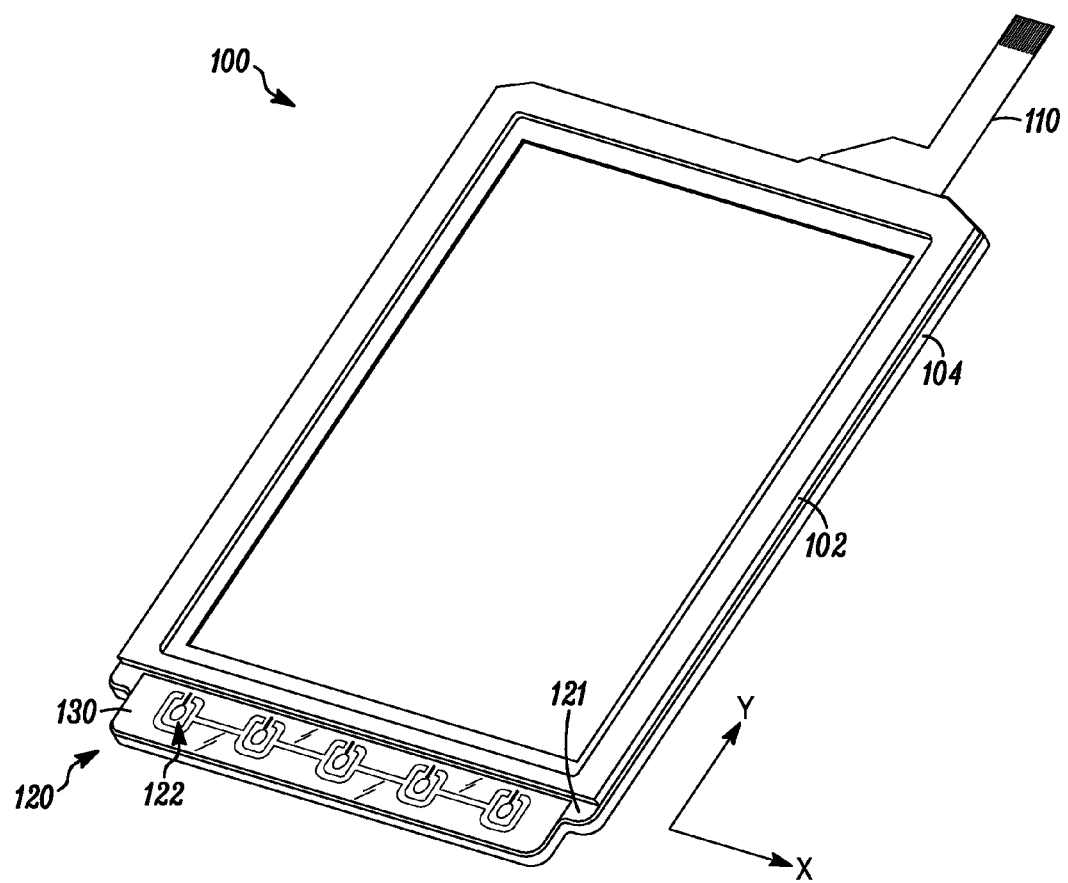
FIG. 2 depicts the touch panel of FIG. 1 during subsequent processing.

As shown, bottom conductor layer 104 extends beyond the top conductor layer 102 (i.e., beyond the edge or perimeter 103 of layer 102), thereby exposing a button region (or simply "region") 120 on surface 121 of bottom conductor layer 104. One or more contact pads 122 are disposed on surface 121 of button region 120, and are configured to interact with a mechanically actuatable component (not shown) such as a key, button, or the like. In the illustrated embodiment, for example, each contact pad 122 is a traditional printed dome pad that includes a ground contact 124 and a respective signal contact 125, both of which are suitably coupled (e.g., via one or more metal traces) to interconnect 110. In this way, the signals produced in response to a touch event may be combined in a single interconnect 110 with key press events associated with button region 120. A dome sheet 130 having respective key regions 132 may be also placed over button region 120 on surface 121, as depicted in FIG. 2.

While FIG. 1 depicts an embodiment in which perimeter 103 of layer 102 is generally rectangular, and button region 120 is adjacent to one side of that rectangle, the present embodiments are not so limited. Layers 102 and 104 may have a variety of shapes (e.g., rectilinear, curvilinear, etc.), and button region 120 (or multiple button regions 120) may be placed at any number of locations around perimeter 103 of layer 102.

Figure 3:
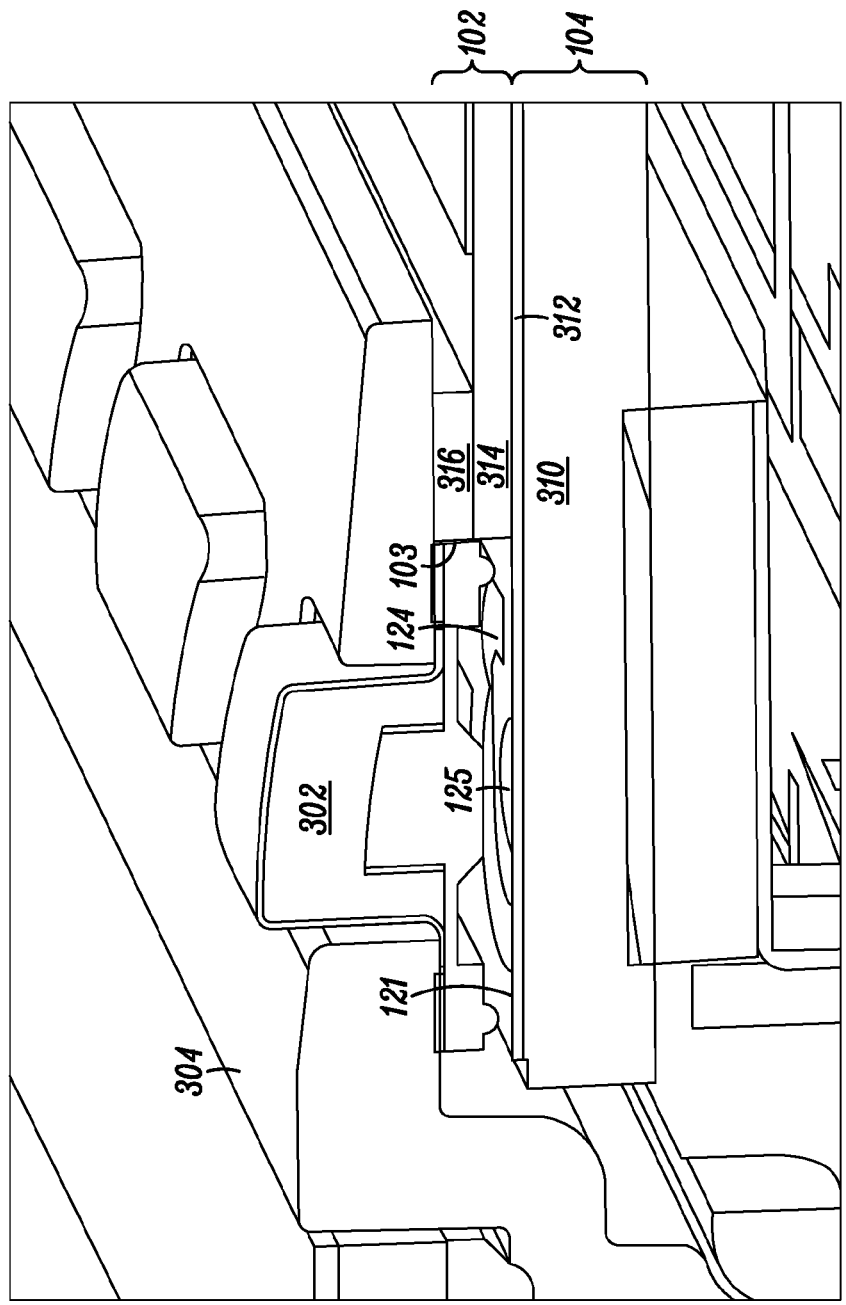
FIG. 3 provides a partial cut-away view of a touch panel assembly in accordance with one embodiment.

FIG. 3 depicts a partial cross-sectional view of a touchscreen assembly in accordance with a particular embodiment. As shown, top conductor layer 102 includes two sublayers: a polymeric (e.g., PET) layer 314, and a second polymeric layer 316 forming a "frame" around perimeter 103. Bottom conductor layer 104 includes a relatively thin polymeric layer 312 and a relatively thick substrate 310 (e.g., a polycarbonate material), which provides structure stability for the assembly.

Layers 312 and 310 extend beyond perimeter 103 as shown, providing a surface 121 on which dome pad contacts 125 and 124 are formed. A button, key, or other such structure 302 is coupled mechanically to dome pad contacts 125 and 124 in any convenient manner, and is secured in place via a housing 304, which acts to restrain the movement of button 302. For the purpose of illustrating the underlying structure, dome sheet 130 (of FIG. 2) is not shown in this figure.

The various layers and sublayers illustrated in FIG. 3 may comprise a variety of materials and may have any suitable thicknesses, depending upon the application. In a particular embodiment, for example, layer 310 is a polycarbonate or glass material having a thickness of approximately 1.0-2.0 mm, and layer 312 is a PET material having a thickness of approximately 0.1 mm.

Figure 4:
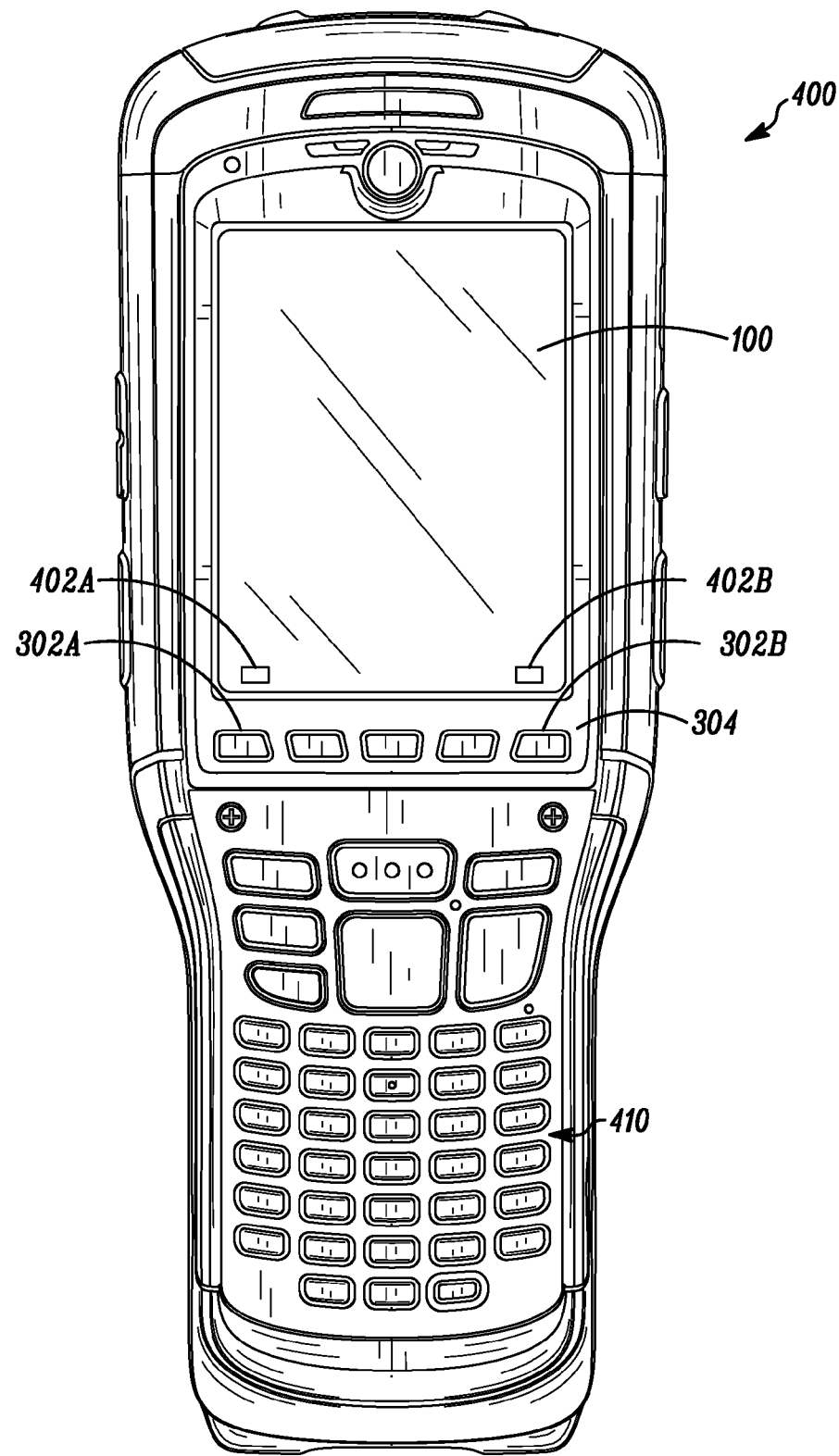
FIG. 4 depicts an exemplary mobile device useful in describing various embodiments.

FIG. 4 depicts an exemplary mobile device 400 incorporating an exemplary touch panel assembly 100 (of FIG. 1) in accordance with one embodiment. As shown, device 400 provides the user with a touchscreen region (assembly 100) as well as a conventional button or keypad region 410. In addition, a group of five buttons 302 are integrated with touch panel assembly 100 as depicted in FIG. 4.

Buttons 302 can then be used for a variety of user interface functions, depending upon the particular context. That is, depending upon the nature of the application or applications running on device 400, certain indicia regarding the nature of each button 302 may be displayed next to the corresponding button.

For example, two graphical user interface components (or simply "graphical components") 402A and 402B may be displayed near the bottom of touch panel assembly 100, adjacent respective buttons 302A and 302B. Graphical components 402A and 402B may contain images, text, or any combination thereof, as is known in the art. For example, 402A may consist of a "CANCEL" indicator, while 402B may consist of an "OK" indicator. The user may then press the respective button 302A or 302B, depending upon the user's desired operation. As noted previously, any number of such buttons 302 may be provided around the perimeter of touch assembly 100. Furthermore, the present embodiments are not limited to mobile devices, and may be used in connection with any type of touchscreen component.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

The invention claimed is:

1. A touch panel assembly comprising:
a first touch panel layer having a perimeter;
a second touch panel layer operatively coupled to the first touch panel layer and extending beyond the perimeter of the first touch panel layer to define a button region on a first surface of the second touch panel layer;
a contact pad disposed on the first surface within the button region, the contact pad configured to interact with a mechanically actuatable component, the contact pad comprising a ground contact and a signal contact; and
an interconnect coupled to the ground and signal contacts and the first and second touch panel layers, wherein the interconnect receives signals produced in response to a touch of the first touch panel layer and signals produced in response to an actuation of the mechanically actuatable component.

2. The touch panel assembly of claim 1, wherein the first touch panel layer is generally rectilinear, and wherein the button region is a generally rectangular region adjacent one edge of the perimeter of the first touch panel layer.

3. The touch panel assembly of claim 1, wherein the first and second touch panel layers are operatively coupled to form a resistive touch panel component.

4. The touch panel assembly of claim 1, wherein the second touch panel layer includes a substrate layer, and a first thermoplastic polymer layer formed on the substrate layer.

5. The touch panel assembly of claim 4, wherein the thermoplastic polymer layer comprises polyethylene terephthalate.

6. The touch panel assembly of claim 4, wherein the substrate layer comprises polycarbonate.

7. The touch panel assembly of claim 4, wherein the first touch panel layer comprises a second thermoplastic polymer layer.

8. The touch panel assembly of claim 7, wherein the second thermoplastic polymer layer comprises polyethylene terephthalate.

9. A method of making a touch panel assembly, comprising:
forming a first touch panel layer having a first perimeter;
forming a second touch panel layer having a second perimeter on the first touch panel layer such that the second perimeter extends beyond the first perimeter of the first touch panel layer and defines a button region on a surface of the second touch panel layer;
forming a contact pad on the surface within the button region such that the contact pad is configured to interact with a mechanically actuatable component, the contact pad comprising a ground contact and a signal contact; and
coupling an interconnect to the ground and signal contacts and the first and second touch panel layers, wherein the interconnect receives signals produced in response to a touch of the first touch panel layer and signals produced in response to an actuation of the mechanically actuatable component.

10. The method of claim 9, wherein the first touch panel layer is generally rectilinear, and wherein the button region is a generally rectangular region adjacent one edge of the perimeter of the second touch panel layer.

11. The method of claim 9, including operatively coupling the first and second touch panel layers to form a resistive touch panel component.

12. The method of claim 9, wherein forming the second touch panel layer includes:
forming a substrate layer; and
forming a first thermoplastic polymer layer on the substrate layer.

13. The method of claim 12, wherein the thermoplastic polymer layer comprises polyethylene terephthalate.

14. The method of claim 12, wherein the substrate layer comprises polycarbonate.

15. A mobile device comprising:
a resistive touch screen display comprising a bottom conductor layer coupled to a top conductor layer, wherein the bottom conductor layer extends beyond the top conductor layer adjacent the top conductor layer, exposing a first surface of the bottom conductor layer; and
a contact pad disposed on the first surface of the bottom conductor layer, the contact pad configured to interact with a mechanically actuatable component, the contact pad comprising a ground contact and a signal contact; and an interconnect coupled to the ground and signal contacts and the top and bottom conductor layers, wherein the interconnect receives signals produced in response to a touch of the top conductor layer and signals produced in response to an actuation of the mechanically actuatable component.

16. The mobile device of claim 15, wherein the resistive touch screen display is configured to display a set of graphical components adjacent to a corresponding set of the manually actuatable components.

17. The mobile device of claim 16, wherein the manually actuatable components each comprise a dome pad printed on the bottom conductor layer, and a button structure attached to the dome pad.

18. The mobile device of claim 17, wherein the bottom conductor layer comprises a substrate and a polyethylene terephthalate layer formed thereon.

* * * * *